United States Patent Office 3,293,883
Patented Dec. 27, 1966

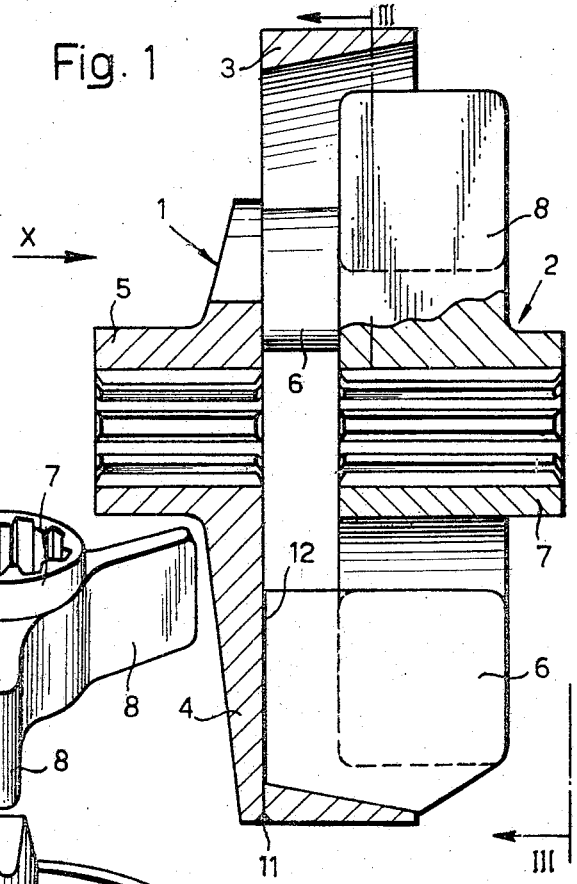
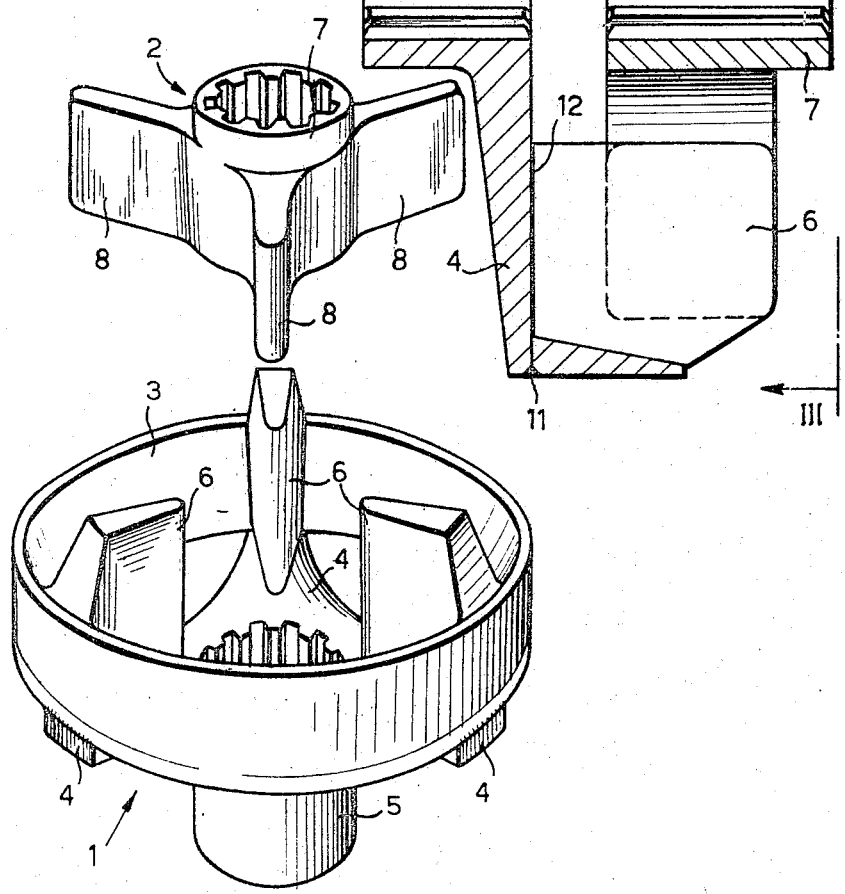

3,293,883
TORQUE TRANSMITTING RESILIENT JOINT
AND MANUFACTURING METHOD
Antonio Boschi and Giovanni Martorana, Milan, Italy, assignors to Società Applicazioni Gomma Antivibranti "SAGA" S.p.A., Milan, Italy
Filed Sept. 29, 1964, Ser. No. 399,981
Claims priority, application Italy, Jan. 24, 1964, 1,582/64
4 Claims. (Cl. 64—14)

This invention relates to resilient joints interconnecting a driving shaft and a driven shaft for transmitting torque and to a method of manufacturing such joints.

More particularly this invention relates to resilient joints of the type comprising two metal joint halves, each having fast therewith a plurality of radial fins, situated in planes extending through the rotational axis of the joint half. The fins are uniformly angularly spaced on the joint halves, each fin associated with one joint half alternating with two fins associated with the other joint half. A rubber pad bonded to both fins is interposed between two consecutive fins associated with the two joint halves.

On relative angular movement about the axis of one joint half with respect to the other, half the number of the rubber pads are subjected to a compression force acting along a straight line interconnecting the centers of the contact surfaces of each pad and adjacent fins, between which the pad is interposed.

The other half of the pads are subjected to a traction force acting along a straight line interconnecting the centers of the contact surfaces of each pad and adjacent fins, between which the pad is interposed.

By reversing the relative angular movement of the joint halves, the nature of the forces acting on the pads changes, so that the pads which were first subjected to a compression are now subjected to a traction, the pads which were previously subjected to a traction being now subjected to a compression.

The traction on the pads tends to loosen the pads from the fins, consequently to deteriorate the joint, more particularly when during operation the joint is subjected to jerks.

This drawback is accentuated when the shafts interconnected by the joint are not aligned, and increases on increase of the angle between the axes of the interconnected shafts.

In order to obviate this drawback it is known to precompress the rubber pads in the direction of the load, in order to confer to each pad an initial compression such as to make up in part at least for the average increase in spacing which the fins associated with one joint half undergo with respect to the fins on the other joint half during operation due to the load as well as to the misalignment of the axes of the interconnected shafts.

However, precompressing of the rubber pads in the joints of the type referred to is difficult to effect.

Therefore, certain compromises are resorted to, by means of which the rubber pads can be given a certain initial pre-compression, such as, in accordance with the teachings of a prior patent to applicants, when each rubber pad is bonded on one side to one fin on a joint half, and on its other side to one branch of a metal plate bent to U-form, which on assembly of the joint is forced on the adjacent wedge shaped fin on the other joint half, whereby the U-plate spreads and precompresses the rubber pad.

The difficulties of pre-stressing the rubber pads increase with their increase in slenderness, i.e., with the increase in ratio of the average length of the rubber pads measured between adjacent fins with respect to the pad width as is the case with highly flexible joints, in which the length of the rubber pads exceeds their width.

On the other hand, more particularly in automobile transmissions, highly flexible resilient joints are required to interconnect shafts the axes of which are at an angle of up to ten degrees, which is variable during transmission of motion, as is usually the case with the drive between the speed box and wheels of the motor vehicles.

An object of this invention is to provide a joint of the type referred to, which is easy to manufacture and the rubber pads of which are suitably precompressed, whichever the ratio of their average length to their width.

With the above objects in view this invention provides a resilient joint of the type referred to, comprising two metal joint halves, each having fast therewith a plurality of radial fins situated in planes extending through the rotational axis, alternating with the fins on the other joint half, and a plurality of rubber pads, each interposed between adjacent fins on both joint halves and bonded thereto, characterized by the fact that one joint half comprises a rim having radial fins fast therewith alternating with the fins on the other joint half, the rubber pads being pre-stressed between the fins on the two joint halves by effect of a permanent deformation in a radial direction of said rim during manufacture of the joint.

The invention also provides a method of manufacturing a resilient joint characterized by the steps of providing a metal rim 3 having a plurality of radial fins 6, a metal hub 5 provided with a plurality of fins 8 matching in number the fins on the rim 3 and situated in planes extending through the axis of the hub 5, arranging the rim 3 and hub 5 coaxially so that the fins 6 on the rim 3 alternate with the fins on the hub 5, molding between consecutive fins 6 and 8 on the rim 3 and hub 5, respectively, crude rubber pads 9, vulcanizing the rubber to bond the pads 9 to the fins 6 and 8 and permanently deforming the rim 3 in a radial direction to displace the fins 6, 8 on the rim 3 towards the center of said rim.

Further characteristic features and advantages of this invention will be understood from the appended detailed description with reference to the accompanying drawings given by way of example, wherein:

FIGURE 1 is an axial sectional view of the resilient joint according to this invention;

FIGURE 4 is an exploded perspective view of two metal joint halves;

Figure 2:
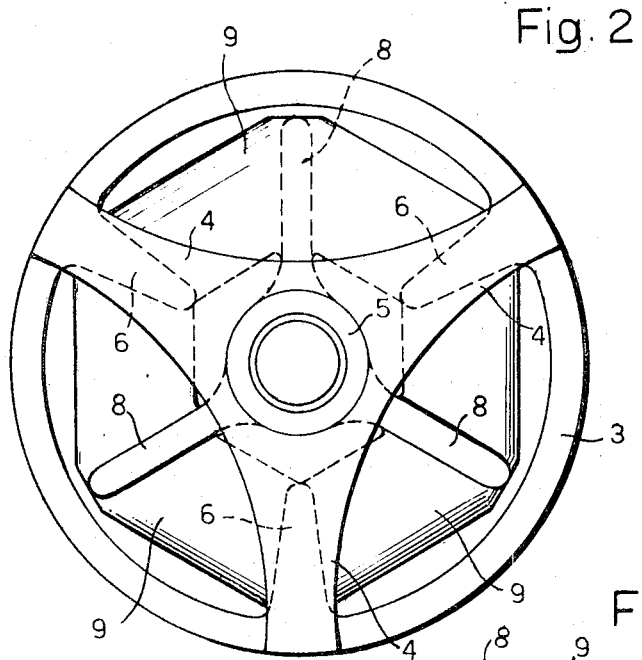
FIGURE 2 is a view on arrow X in FIGURE 1.

Referring to FIGURES 1 to 5 the joint according to this invention comprises two metal joint halves 1, 2.

The metal joint half 1 comprises a rim 3 provided internally with a plurality of radial fins 6, each having a wedge shaped cross section tapering towards the rim centre.

The fins 6 (FIGURES 1 and 4) extend throughout the axial length of the rim 3 and beyond one end of the latter.

The fin carrying rim 3 is secured by a welding 11 or other means known per se to three spokes 4 of a hub 5 which is internally splined for connection with a shaft.

The metal joint half 2 comprises an internally splined hub 7 provided externally with radial fins 8 matching in number the fins on the rim 3.

When assembled the two joint halves 1, 2 are axially aligned so that the fins 8 on the joint half 2 alternate with the fins 6 on the joint half 1 and the tips of fins 8 and 6 are spaced from the rim 3 and hub 2, respectively.

The inner surface of the rim 3 is flared to increase the relative angular displacements of the axes of the two joint halves 1, 2 by preventing the fins 8 on the joint half 2 to come into contact with the rim 3.

Figure 3:
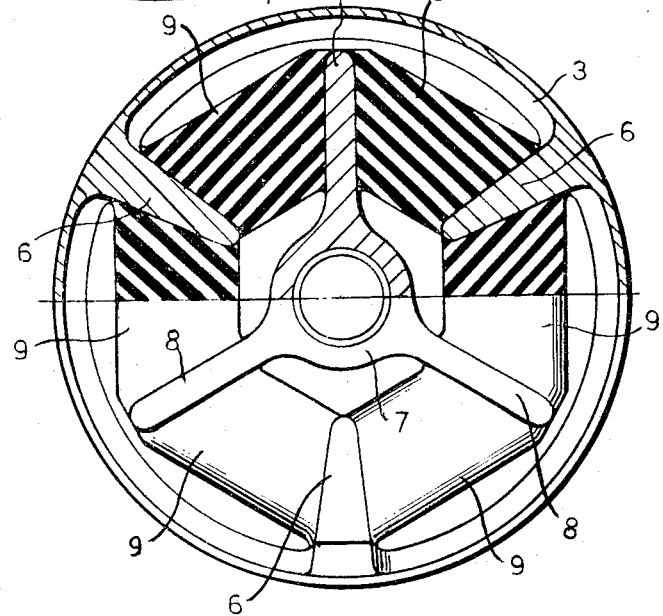
FIGURE 3 is a view on line III—III of FIGURE 1.

A rubber pad 9 is interposed between each pair of contiguous fins 6, 8 of the two joint halves 1, 2 and is bonded to opposite faces of said pair of fins (FIGURES 1 and 3).

The method of manufacturing the above described flexible joint comprises the step of providing the hub 5 having fins 8, and a rim 3 having fins 6, the outside diameter of said rim being larger than that of the finished joint.

By the next step the rim 3 and hub 5 are coaxially arranged, so that the fins 6 on the rim 3 alternate with the fins 8 on the hub 5.

Then pads 9 of crude rubber are molded between the consecutive fins on the rim and hub, the rubber being vulcanized to bond the pads 9 to the fins 6, 8.

Figure 5:
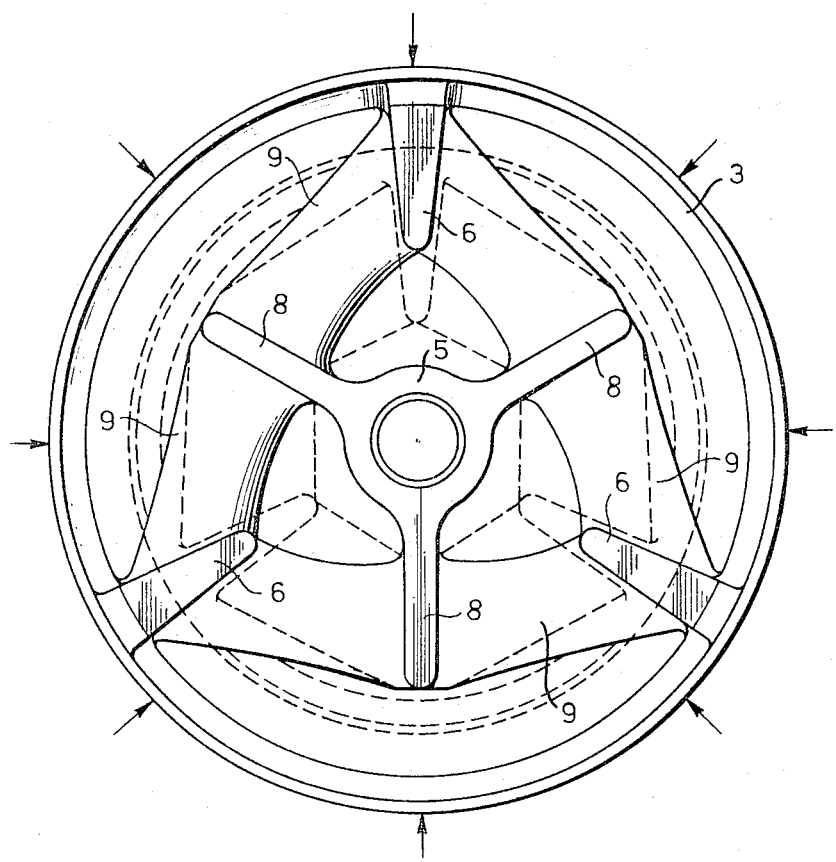
FIGURE 5 is a front view of the joint according to this invention in the course of manufacture.

The rim 3 is finally permanently deformed in a radial direction in a known manner such as by forcing it through a plurality of dies having reducing holes, whereby the fins 6 are displaced towards the hub 5 and compress the rubber pads 9 against the fins 8 (FIGURE 5). Finally, the rim 3 is welded to the spokes 4 of a further hub 7.

The uniform distribution of the compression stress throughout the cross section of the rubber pads 9 is achieved by giving a suitable taper to the wedge shaped fins 8.

By arranging in series two similar resilient joints a unit is obtained, in which the conical and torsional flexibility is doubled with respect to the individual flexibility of each component joint. The joint according to this invention is suitable for combining two joints to a unit, resulting in a compact construction smaller in axial length than a conventional set.

Figure 6:
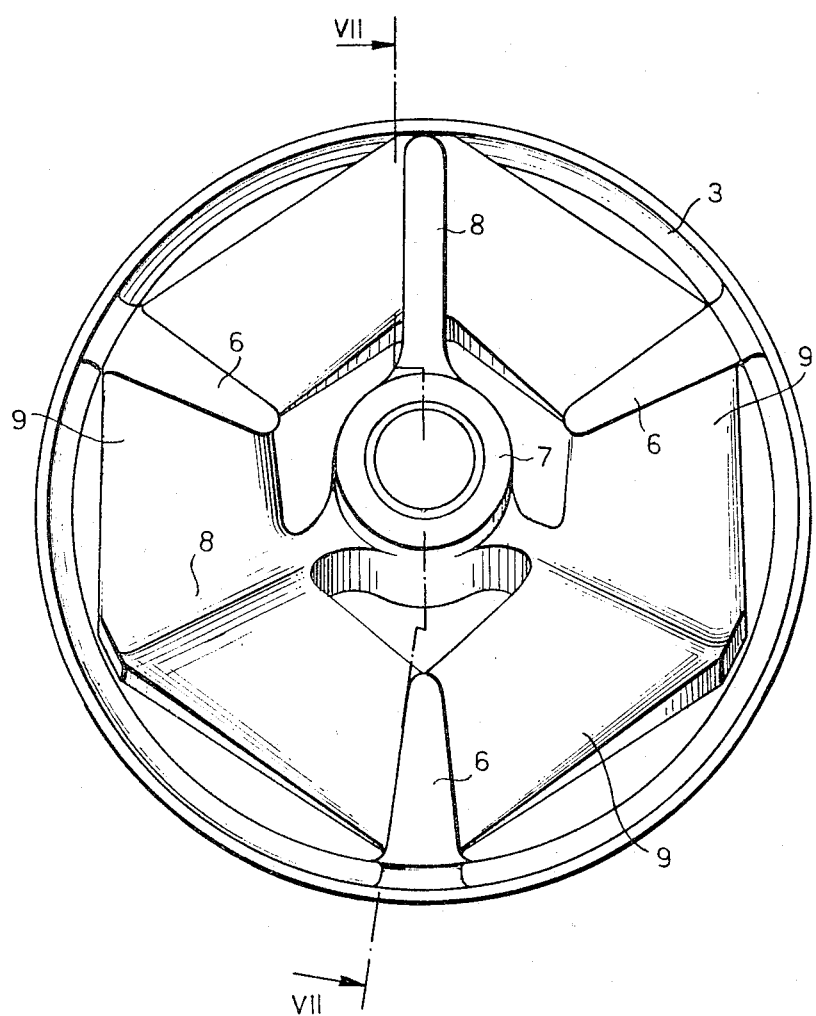
FIGURE 6 is a front view of two coupled joints.
Figure 7:
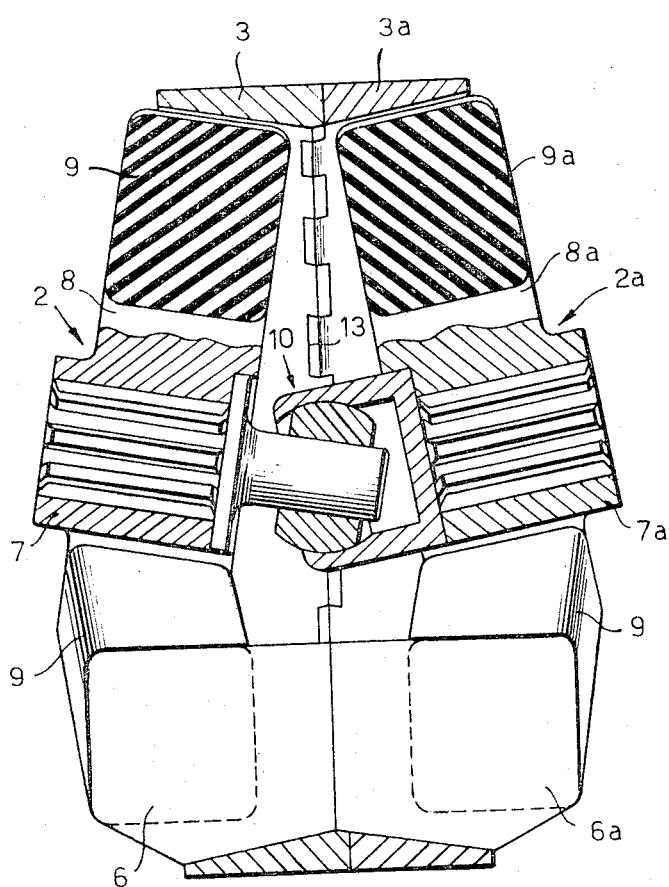
FIGURE 7 is a sectional view on line VII—VII of FIGURE 6.

To provide a two-joint unit the fin-carrying rim 3 of one component joint is coaxially secured in a known manner such as by dog-teeth 13 subsequently welded to a similar fin-carrying rim 3a of a further component joint (FIGURES 6, 7).

The fins 6 on the rim 3 are aligned with the fins 6a on the rim 3a.

The fins 6, 6a on the rims 3, 3a alternate with the fins 8, 8a of metal joint halves 2, 2a and two sets of prestressed rubber pads 9, 9a are arranged between the fins 6, 8 and 6a, 8a respectively.

The hubs 7, 7a are interconnected by a universal joint 10 arranged in the middle of the double joint.

What we claim is:

1. A torque transmitting resilient joint comprising: a rigid spider having a plurality of radial fins directed outwardly in axial planes, a circular rigid rim of malleable metal integrally formed with a plurality of radial fins inwardly extending therefrom in axial planes alternating with the fins on the spider, said rim having a cylindrical outer surface and a substantially frusto-conical inner surface, a plurality of in situ vulcanized, pre-compressed rubber blocks, each of said blocks resiliently interconnecting a respective one of the fins on the rim and a respective one of the fins on the spider and being directly bonded to said fins, and separately formed means rigidly connected to the rim at the side of the rim corresponding to the small end of said frusto-conical surface and providing together with said spider torque-applying means in the joint.

2. A torque transmitting resilient joint as defined in claim 1, in which said separately formed means comprises a hub and radial spokes integral with the hub and rigidly connected to the rim at the side of the rim corresponding to the small end of said frusto-conical surface.

3. A method of manufacturing a torque-transmitting resilient joint comprising: providing a rigid spider having a plurality of radial fins directed outwardly in axial planes, providing a circular rigid rim of malleable metal integrally formed with a plurality of radial fins extending inwardly therefrom in axial planes in an arrangement interposable between the fins on the spider, said rim having a cylindrical outer surface and a substantially frusto-conical inner surface, molding and vulcanizing in situ between each pair of alternating fins on the rim and the spider a resilient rubber block to thereby establish direct rubber-to-fin bonds in the joint and to resiliently interconnect the fins on the rim and the respective fins on the spider, precompressing the blocks between their respective fins by reducing the diameter of the rim by plastic permanent deformation of the latter, and then rigidly attaching to the rim, at the side of the latter corresponding to the small end of said frusto-conical surface, a member through which torque may be applied to the joint in operation of the latter.

4. A torque transmitting resilient joint comprising: a rigid spider having a plurality of radial fins directed outwardly in axial planes, a circular rigid rim of malleable metal integrally formed with a plurality of radial fins inwardly extending therefrom in axial planes alternating with the fins on the spider, said rim having a cylindrical outer surface and a substantially frusto-conical inner surface, a plurality of in situ vulcanized, pre-compressed rubber blocks, each of said blocks resiliently interconnecting a respective one of the fins on the rim and a respective one of the fins on the spider and being directly bonded to said fins, said blocks being pre-compressed between said respective fins by a radially inward permanent deforming of the rim, and separately formed means rigidly connected to the rim at the side of the rim corresponding to the small end of said frusto-conical surface and providing together with said spider torque-applying means in the joint.

References Cited by the Examiner

UNITED STATES PATENTS

| | | | |
|---|---|---|---|
| 1,638,947 | 8/1927 | Masury et al. | 64—14 |
| 1,827,233 | 10/1931 | Hughes | 29—149.5 X |
| 1,878,730 | 9/1932 | Sykes | 64—14 |
| 2,219,144 | 10/1940 | Williams | 64—14 |
| 2,381,096 | 8/1945 | Abbott | 64—7 |
| 2,708,352 | 5/1955 | Boschi | 64—14 |
| 3,094,853 | 6/1963 | Boschi | 64—14 |
| 3,112,626 | 12/1963 | Barone | 64—11 |
| 3,191,265 | 6/1965 | McCloskey | 29—149.5 |

FRED C. MATTERN, JR., *Primary Examiner.*

HALL C. COE, *Examiner.*